(12) United States Patent
Berg et al.

(10) Patent No.: US 7,750,975 B2
(45) Date of Patent: Jul. 6, 2010

(54) BTSC PILOT SIGNAL LOCK

(75) Inventors: Erik Berg, Laguna Beach, CA (US); Gopal Triplicane Venkatesan, Aliso Viejo, CA (US); Hosahalli Srinivas, Irvine, CA (US); Amy Hundhausen, Laguna Beach, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 12/269,140

(22) Filed: Nov. 12, 2008

(65) Prior Publication Data

US 2009/0059069 A1   Mar. 5, 2009

Related U.S. Application Data

(63) Continuation of application No. 10/784,760, filed on Feb. 23, 2004, now Pat. No. 7,463,310.

(60) Provisional application No. 60/495,025, filed on Aug. 14, 2003.

(51) Int. Cl.
*H04N 7/08* (2006.01)
*H04H 20/47* (2008.01)

(52) U.S. Cl. .................. 348/484; 348/485; 381/2

(58) Field of Classification Search .......... 348/484, 348/485; 704/500–504; 381/2; 327/129; 708/276; 375/224, 226, 361, 371, 374, 376; 331/1 A, 172
See application file for complete search history.

(56) References Cited

U.S. PATENT DOCUMENTS

| | | | | |
|---|---|---|---|---|
| 3,989,931 A * | 11/1976 | Phillips | ...................... | 377/43 |
| 4,896,334 A * | 1/1990 | Sayar | ........................ | 375/293 |
| 5,060,180 A * | 10/1991 | Kingston et al. | ............ | 708/306 |
| 5,222,144 A * | 6/1993 | Whikehart | .................... | 381/15 |
| 5,295,079 A * | 3/1994 | Wong et al. | ................. | 714/715 |
| 5,369,404 A * | 11/1994 | Galton | ........................ | 341/143 |
| 5,412,481 A * | 5/1995 | Ko et al. | ....................... | 386/19 |
| 5,497,405 A * | 3/1996 | Elliott et al. | ................ | 375/372 |
| 5,625,358 A * | 4/1997 | Wilson et al. | .............. | 341/143 |
| 5,638,010 A * | 6/1997 | Adams | ...................... | 327/105 |
| 6,259,482 B1 * | 7/2001 | Easley et al. | ............... | 348/485 |
| 6,441,482 B1 * | 8/2002 | Foster | ....................... | 257/724 |
| 6,567,981 B1 * | 5/2003 | Jeffrey | ....................... | 725/80 |
| 6,580,376 B2 * | 6/2003 | Perrott | ....................... | 341/61 |
| 6,636,120 B2 * | 10/2003 | Bhakta et al. | ................. | 331/17 |
| 6,707,917 B1 * | 3/2004 | Landgraf et al. | .............. | 381/11 |
| 6,738,205 B1 * | 5/2004 | Moran et al. | .................. | 360/17 |
| 6,832,078 B2 * | 12/2004 | Wu | .......................... | 455/237.1 |
| 6,859,238 B2 * | 2/2005 | Wu | .......................... | 348/738 |
| 7,079,657 B2 * | 7/2006 | Wu et al. | ....................... | 381/2 |
| 7,088,787 B2 * | 8/2006 | Wang et al. | .................. | 375/316 |
| 7,253,753 B2 * | 8/2007 | Wu et al. | ....................... | 341/61 |
| 2002/0183030 A1* | 12/2002 | Damgaard et al. | .......... | 455/258 |
| 2003/0056157 A1* | 3/2003 | Fala et al. | .................... | 714/700 |
| 2005/0077969 A1* | 4/2005 | Lalt et al. | .................... | 331/1 A |
| 2006/0182279 A1* | 8/2006 | Maruo et al. | ................ | 380/210 |

\* cited by examiner

*Primary Examiner*—Victor Kostak
(74) *Attorney, Agent, or Firm*—Garlick Harrison & Markison

(57) ABSTRACT

An integrated digital BTSC encoder with an improved pilot signal generator substantially implemented on a single CMOS integrated circuit. By digitally generating a sinusoid that is frequency locked to a two-state input reference signal using a high rate internal clock, a hardware-efficient BTSC pilot signal generator is provided with good acquisition and tracking performance. Implemented efficiently as a simple phase detector, a low-complexity loop filter, a pilot frequency offset adder, a phase accumulator and a sinusoidal generator, the invention enables lower-rate post-processing of the pilot tone without a costly variable interpolator decimator structures.

14 Claims, 5 Drawing Sheets

BTSC PILOT SIGNAL LOCK

RELATED APPLICATIONS

This application is a continuation of and claims priority to U.S. patent application having an application Ser. No. 10/784,760, filed Feb. 23, 2004; which application claims priority to U.S. Provisional Patent Application No. 60/495,025, entitled "BTSC Pilot Signal Lock" filed Aug. 14, 2003; and in which both applications are hereby incorporated by reference.

BACKGROUND OF THE INVENTION

1. Field of the Invention

The present invention is directed in general to television modulators. In one aspect, the present invention relates to a method and system for generating a carrier tone for an audio signal that is synchronized to an associated video signal in accordance with established standards for the broadcast of stereophonic cable and television signals in the United States and in other countries. In a further aspect, the present invention provides an integrated circuit system for generating an aural pilot subcarrier for use in digital BTSC stereo encoding and decoding.

2. Related Art

In 1984, the Federal Communications Commission (FCC) adopted a standard for the audio portion of television signals called Multichannel Television Sound (MTS) Transmission and Audio Processing Requirements for the BTSC System—OET-60, which permitted television programs to be broadcast and received with bichannel audio, e.g., stereophonic sound. Similar to the definition of stereo for FM radio broadcast, MTS defined a system for enhanced, stereo audio for television broadcast and reception. Also known as BTSC stereo encoding (after the Broadcast Television System Committee (BTSC) that defined it), the BTSC transmission methodology is built around the concept of companding, which means that certain aspects of the incoming signal are compressed during the encoding process. A complementary expansion of the signal is then applied during the decoding process.

The original monophonic television signals carried only a single channel of audio. Due to the configuration of the monophonic television signal and the need to maintain compatibility with existing television sets, the stereophonic information was necessarily located in a higher frequency region of the BTSC signal, making the stereophonic channel much noisier than the monophonic audio channel. This resulted in an inherently higher noise floor for the stereo signal than for the monophonic signal. The BTSC standard overcame this problem by defining an encoding system that provided additional signal processing for the stereophonic audio signal. Prior to broadcast of a BTSC signal by a television station, the audio portion of a television program is encoded in the manner prescribed by the BTSC standard, and upon reception of a BTSC signal, a receiver (e.g., a television set) then decodes the audio portion in a complementary manner. This complementary encoding and decoding ensures that the signal-to-noise ratio of the entire stereo audio signal is maintained at acceptable levels. FIG. 1 is a block diagram of the front end portion of an analog BTSC encoding system 100, as defined by the BTSC standard. Encoder 100 receives left and right channel audio input signals (indicated in FIG. 1 as "L" and "R", respectively) and generates a conditioned sum signal ("L+R") and an encoded difference signal ("L−R"). It will be appreciated that the processing of the sum signal ("L+R") and difference signal ("L−R") by the encoder 100 is substantially as described in the Background section of U.S. Pat. No. 5,796,842 which explains that the BTSC standard rigorously defines the desired operation of the encoding filters in terms of idealized analog filters.

To create the stereo signal, the BTSC standard also defines a composite stereophonic baseband signal (referred to hereinafter as the "composite signal") that is used to generate the audio portion of a BTSC signal. The composite signal is generated using the conditioned sum signal ("L+R"), the encoded difference signal ("L−R"), and a tone signal, commonly referred to as the "pilot tone" or simply as the "pilot," which is a sine wave at a frequency Fp, where Fp is equal to 15,734 Hz.

FIG. 2 is a graph of the spectrum of the composite signal. In FIG. 2, the spectral band 202 containing the content of the conditioned sum signal (or the "sum channel signal") is indicated as "L+R." The spectral sideband 204 containing the content of the frequency shifted encoded difference signal (or the "difference channel signal") is each indicated as "L−R," and the pilot tone 210 is indicated by the arrow at frequency Fp. In addition, the spectral sideband 206 containing the content of the frequency shifted encoded secondary audio program (or the "secondary audio channel") is each indicated as "SAP," and the spectral sideband 208 containing the content of the frequency shifted professional channel is each indicated as "Professional Channel."

The encoded "L+R" and "L−R" signals are transmitted to the receiver, such as a stereo television set, where a stereo decoder uses both the "L+R" and "L−R" signals in a matrix that decodes and restores the original L and R audio program. For purposes of transmitting a BTSC encoded signal, a third signal, called the pilot subcarrier signal 210, is inserted between the main-channel signal 202 (L+R) and the stereo signal 204 (L−R), as illustrated in FIG. 2. According to the BTSC standard, the "pilot subcarrier shall be frequency locked to the horizontal scanning frequency of the transmitted video signal," and may be used to indicate the presence of multiple sound channels or to process these sound channels at the receiver. The composite signal is generated by multiplying the encoded difference signal by a waveform that oscillates at twice the pilot frequency according to the cosine function $\cos(4\pi F_p t)$, where t is time, to generate an amplitude modulated, double-sideband, suppressed carrier signal and by then adding to this signal the conditioned sum signal and the pilot tone.

In the past, BTSC stereo encoders and decoders were implemented using analog circuits. Prior attempts to produce a sinusoidal pilot signal have used sinusoidal input tones or otherwise analog signal tracking techniques to have a sinusoidal pilot tone track the horizontal scanning frequency of the transmitted video signal. However, conventional analog BTSC encoders (such as described in U.S. Pat. No. 4,539,526) have been replaced by digital encoders because of the many benefits of digital technology. Prior attempts to implement the analog BTSC encoder 100 in digital form have failed to exactly match the performance of analog encoder 100. This difficulty arises from the fact that the BTSC standard defines all the critical components of idealized encoder 100 in terms of analog filter transfer functions, and prior digital encoders have not been able to provide digital filters that exactly match the requirements of the BTSC-specified analog filters. As a result, conventional digital BTSC encoders (such as those described in U.S. Pat. Nos. 5,796,842 and 6,118,879) have deviated from the theoretical ideal specified by the BTSC standard, and have attempted to compensate for this deviation by deliberately introducing a compensating phase or magnitude error in the encoding process. To the extent that conventional digital encoders have attempted to provide a digital tracking mechanism for the aural pilot subcarrier, conventional digital techniques have had only limited resolution due to sampling rate limitations, or have used complex filter structures that contribute to circuit size and cost. In addition, conventional digital phase and tracking loop approaches have used clock rates similar in frequency to the repetition rate of the input reference clock, and as a result have suffered from poor acquisition/tracking performance.

In addition to the complexity of the computational requirements for encoding the stereo signals, such as described above, the ever-increasing need for higher speed communications systems imposes additional performance requirements and resulting costs for BTSC encoding systems. In order to reduce costs, communications systems are increasingly implemented using Very Large Scale Integration (VLSI) techniques. The level of integration of communications systems is constantly increasing to take advantage of advances in integrated circuit manufacturing technology and the resulting cost reductions. This means that communications systems of higher and higher complexity are being implemented in a smaller and smaller number of integrated circuits. For reasons of cost and density of integration, the preferred technology is CMOS. To this end, digital signal processing ("DSP") techniques generally allow higher levels of complexity and easier scaling to finer geometry technologies than analog techniques, as well as superior testability and manufacturability.

There is a need to provide a digital encoding system for processing stereophonic audio signals in compliance with the BTSC standard that provides accurately encoded audio signals. Conventionally known systems have used overly complex circuits to generate pilot signals with insufficient frequency resolution. Further, the nature of existing analog BTSC encoders has made them inconvenient to use with digital equipment such as digital playback devices. A digital BTSC encoder could accept the digital audio signals directly and could therefore be more easily integrated with other digital equipment. Therefore, there is a need for a better system that is capable of performing the above functions and overcoming these difficulties without increasing circuit area and operational power. Further limitations and disadvantages of conventional systems will become apparent to one of skill in the art after reviewing the remainder of the present application with reference to the drawings and detailed description which follow.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION OF THE EMBODIMENTS OF THE INVENTION

Figure 3:
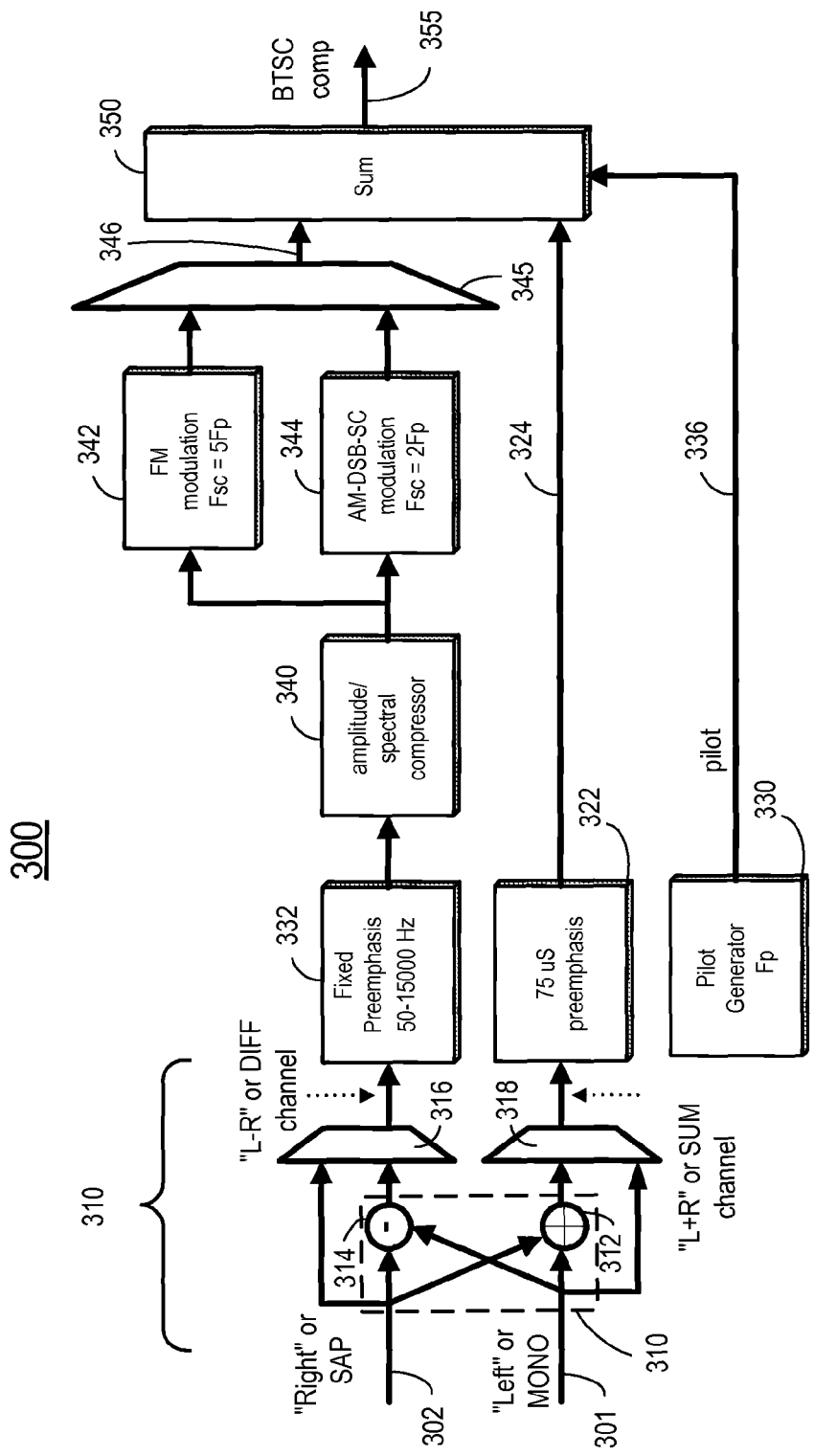
FIG. 3 depicts a system level description of a BTSC encoder in accordance with the present invention.

An apparatus and method in accordance with the present invention provide a system for producing a digital sinusoid signal that is frequency locked to another reference signal. As will be appreciated, a digital tracking signal generator of the present invention has many potential applications. For example, the digital tracking signal generator can be used with digitally encoding of stereo signals in accordance with the BTSC standard. A system level description of the operation of a BTSC encoder application of the present invention is shown in FIG. 3 which depicts a diagram of a digital BTSC encoder 300. The output of this encoder 300 is a BTSC compliant signal which includes stereo and SAP functionality for stereo encoding, advantageously sharing an amplitude/spectral compressor circuit 340 to thereby reduce the circuit size. It will be appreciated that the encoder of the present invention may also be implemented to provide the professional channel encoding specified by the BTSC standard, or may otherwise output a baseband BTSC multiplex signal at output 355. For example, the BTSC encoder may be included as part of an RF modulator core (RFM) in a television set-top box device that converts a NTSC/PAL/SECAM compliant digital composite video source and a pulse code modulated (PCM) audio source into an analog composite television signal that is suitable for demodulation by a television demodulator. In this application, the baseband BTSC composite signal 355 is fed to a rate converter and FM modulator that modulates the aural carrier, and the resulting signal is then summed with a baseband composite video signal. The combined audio/video signal is mixed to a RF frequency, converted to analog form and sent off chip.

As indicated in FIG. 3, the BTSC encoder receives two 18-bit audio channel inputs (L 301 and R 302). To allow proper digital processing of the signals, the encoder should operate at a sufficiently high rate (for example, 10-20 times the audio bandwidth) to allow the analog and digital filters to match in phase and amplitude. The choice of the sampling rate is driven by the need for the digital filter implementations to more closely match the analog filter transform functions (specified by the BTSC standard) in both magnitude and phase. A sample rate above 200 kHz (e.g., 316 kHz) results in good matching of the magnitude and phase responses between the analog and digital domains so that no phase compensation is needed in the encoding process. In a selected embodiment, two channel inputs 301, 302 which arrive at a first sample rate (e.g., 27 MHz/32) are converted to a second sample rate (e.g., 54 MHz/171) by input variable interpolator decimator VID (Variable Rate Interpolator Decimator) structures (not shown).

In connection with the system level description of FIG. 3, when monophonic (MONO) audio processing is desired, the Left and Right channels of the input stereo audio signal 301, 302 are summed (in a summer 312) and passed to a 75 μsecond preemphasis filter 322. This datapath is considered to be the SUM channel. The 75 μsecond preemphasis filter 322 provides extra gain to the high-frequency components. The output of the preemphasis filter 322 is passed directly to the summing device 350. The other two inputs to the final summation 350 in the BTSC encoder 300, which are the DIFF channel output 346 and the pilot tone 336, are zeroed out.

Note that the SUM channel is sometimes referred to as the L+R channel, and the DIFF channel is sometimes referred to as the L−R channel.

When SAP (secondary audio program) processing is desired in the encoder of FIG. 3, the monophonic SAP signal replaces the "Right" audio input channel. The BTSC encoder first sharply bandlimits the SAP audio input stream to 10 kHz using a low-pass filter (not shown). The resulting signal is passed through the DIFF channel to a fixed preemphasis filter 332 whose characteristics are defined in the MTS OET-60. The output of this filter 332 is passed to amplitude/spectral compressor module 340. The output of amplitude/spectral compressor module 340 FM modulates the carrier sine wave whose frequency is five times the pilot rate of 15.734 kHz.

When dual monophonic (DUAL MONO) operation is desired, a monophonic audio signal replaces the "Left" audio input channel, and the SAP signal replaces the "Right" audio input channel. Thus, the main monophonic signal is transmitted through the SUM channel at the same time that the SAP signal is transmitted through the DIFF channel. Note that in this case, the left audio input 300 and the right SAP input 302 bypass the adder 312 and subtractor 314 and pass through the multiplexers 316 and 318 to the SUM channel and DIFF channel.

Stereo processing is very similar to dual monophonic processing. In the encoder of FIG. 3, an input section 310 receives the left and right channel audio input signals and generates therefrom a sum signal and a difference signal. A signal addition device 312 produces the SUM (L+R) channel based on the sum of the Left and Right channels of the input stereo audio signal. A signal subtraction device 314 produces the DIFF (L−R) channel based on the difference between the Left and Right channels of the input stereo audio signal. It will be appreciated that a matrix functionality may be used to receive the digital left and digital right signals and to generate the digital sum signal and digital difference signal. The SUM channel is passed through the 75 μsecond preemphasis filter 322, and the DIFF channel is passed through the fixed preemphasis filter 332 and the amplitude/spectral compressor module 340. The output of amplitude/spectral compressor 340 is passed to the DSB SC (Double Side Band Suppressed Carrier) AM (Amplitude Modulator) block 344, where it amplitude modulates the sine wave carrier whose frequency (31,468 Hz) is equal to twice that of the pilot tone (15,734 Hz). The output 346 of this modulator along with 324 and 336 is passed to the sum block 350 that produces the BTSC composite signals 355. The output of encoder 300 is a BTSC composite signal 355 that is used to FM modulate the aural carrier.

The output 346 of this modulator along with 324 and 326 is passed to the sum block 350 that produces the BTSC composite signal 355.

Figure 4:
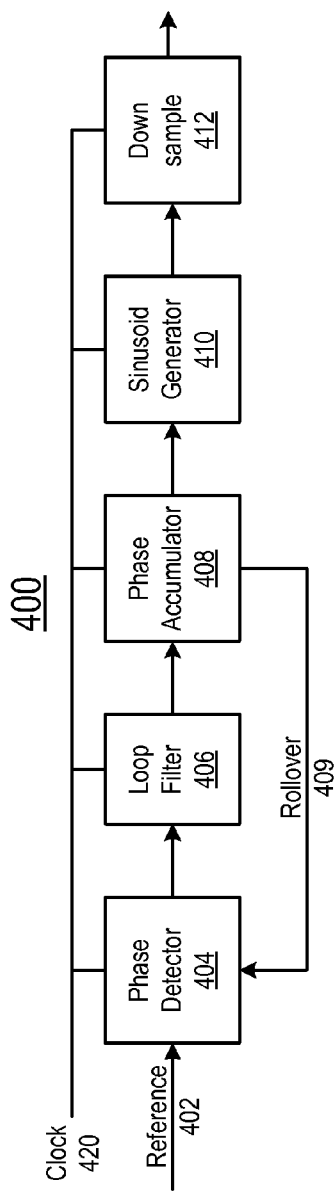
FIG. 4 depicts a block diagram of a digital BTSC pilot signal generator in accordance with the present invention.

FIG. 4 depicts a block diagram of a digital BTSC pilot signal generator 400 in accordance with a selected embodiment of the present invention. When implemented as a digital phase (and frequency) tracking loop, the present invention includes a reference signal input 402, phase detector 404, loop filter 406, and local phase generator 408. By constructing the components of the pilot signal generator 400 with a digital circuit implementation that uses a clock signal 420 having a fixed rate ("Fclk") that is much higher than the repetition rate ("Fref") of the input reference signal 402, all of the blocks shown in FIG. 4 run at the higher Fclk rate. For example, if the BTSC stereo encoder 300 depicted in FIG. 3 uses an internal 27 MHz clock, and the encoder 300 is encoding a stereo signal associated with an NTSC encoded video signal having a horizontal scan rate of Fref=(4.5 MHz/286)= (27 MHz/1716)=15.734266 kHz, the reference signal input 402 has a repetition rate equal on average to 15.734266 kHz. Once the loop converges, the "Rollover" signal 409 is also expected to have a periodicity equal on average to 15.734266 kHz.

An advantage of a selected embodiment of the present invention is the improved resolution available for tracking digital phase information by using high clock signal rates. As will be appreciated, the ability of a digital phase locked loop (PLL) to track the phase of the incoming reference signal is determined by the chosen clock signal rate, Fclk. For example, if the time interval between samples is set at Tclk=1 ns, new inputs are sampled and processed at times 0 ns, 1 ns, 2 ns, etc. The phase detector 404 can not distinguish between an input that changes at time 0.25 ns and an input that changes at time 0.5 ns. More generally, the phase detector 404 can not distinguish between an input that changes at time t1 and an input that changes at time t2 if (t2−t1)<(Tclk=1/Fclk). The phase detector 404 can only discriminate with a resolution in time of the clock period, Tclk. If the clock rate is too low, the clock period can approach a significant fraction of the input reference signal's repetition rate, resulting in diminished accuracy in tracking the input reference signal frequency, which is just the change per time in the input reference signal's phase. In accordance with the present invention, a 27 MHz clock rate (Fclk) for the digital phase lock loop denotes a 37 nanosecond period, which would provide a tracking performance of up to approximately (Tclk/Tref)= (Fref/Fclk)=1/1716=583 PPM (parts per million). As the clock rate is lowered, the minimum resolution value will increase, reducing its performance. So long as the internal clock rate frequency Fclk is substantially higher than the encoder clock rate Fref, the tracking loop 400 exhibits good performance.

Figure 5:
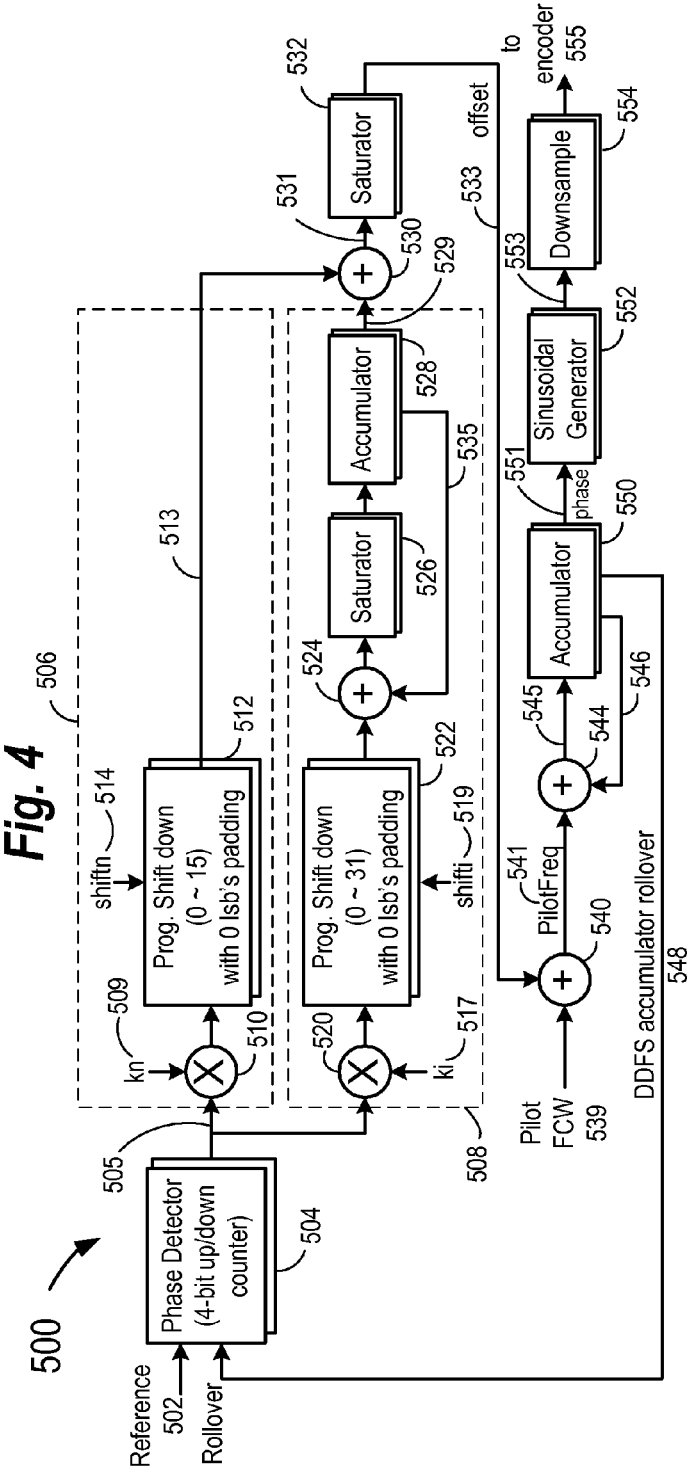
FIG. 5 illustrates one embodiment of a BTSC encoder pilot locking loop constructed according to the invention.

FIG. 5 illustrates a selected embodiment of a BTSC encoder pilot locking loop device 500 constructed according to the invention. The input reference signal 502 ("Reference") to the phase detector 504 of the device is a pulse train that repeats at the horizontal scanning frequency of the video signal. For the depicted example, the device 500 is clocked with a clock signal (not shown) having a 27 MHz clock rate (Fclk). This means that the reference pulses 502 are expected to arrive on average once every 1716 clocks. The second input of the phase detector 504 is a feedback or rollover signal 548 from the phase accumulator 550. The rollover signal 548 is also a pulse train. The phase accumulator 550 produces these pulses whenever the phase in the accumulator "wraps around" from the maximum value to the minimum value. When the loop is fully locked, the rollover and reference pulse trains will be perfectly aligned.

In a selected embodiment, the phase detector 504 is implemented as a four bit up-down counter whose output indicates the phase relationship between the two input pulse trains. In operation, the phase detector 504 increments the counter when the reference pulse 502 arrives and decrements the counter when the rollover pulse 548 arrives. If the reference and rollover signals 502, 548 arrive simultaneously, the value of the loop detector is not changed. In steady-state locked operation, when the two pulse trains are aligned, the phase detector 504 should always output a zero value, denoting that the frequencies (and phases) of the reference and rollover signals 502, 548 are the same.

The phase detector 504 also indicates when there is a phase difference between the two pulse trains 502, 548. For example, suppose that the reference pulse 502 occurs some number of clocks before the rollover pulse 548. Assuming that the original output state of the loop filter is zero, the arrival of the reference pulse 502 will increment the counter 504 to a value of one. Some number of clocks later, the rollover pulse 548 will arrive, and the phase detector output 505 will decrement back to zero. As a result, the delay between the two pulses 502, 548 will produce a phase detector output 505 consisting of a pulse of value one with width equal to the time delay.

As shown in FIG. 5, the phase detector output 505 is processed by a digital loop filter, illustrated as a proportional plus integrator digital filter implementation 506, 508. The digital loop filter controls the dynamic behavior of the pilot locking loop signal generator device 500. In the proportional plus integrator digital filter embodiment depicted in FIG. 5, the output 531 is the sum of two additive terms: a "proportional" (or "linear") term 513 whose value is directly proportional to the output of the loop filter, and an "integrator" term 529 whose value is the output of an integrator 528.

The scaling of the linear and integral terms 513, 529 of the loop filter is produced by multiplying the phase detector output 505 by a linear coefficient and an integrator coefficient, respectively. In a selected embodiment, these coefficients are implemented using a cascade of two programmable stages. The first stage consists of multipliers 510, 520 using a linear multiplier term kn 509 and an integrator multiplier term ki 517, respectively. The second stage consists of power-of-two shifters 512, 522. The power-of-two shifters 512, 522 provide coarse coefficient control, while the multipliers 510, 520 allow for finer setting of the coefficient value.

The output 551 of the phase accumulator 550 shown in FIG. 5 represents the phase of the sinusoidal output of phase locking loop. The input 545 of the phase accumulator 550 corresponds to the instantaneous frequency of the sinusoid and is the sum of two values: the frequency control word (FCW) 539, which is a fixed value corresponding to the expected average frequency of the output sinusoid, and the "offset" value 533, which is the output of the loop filter. The output 551 of the phase accumulator 550 is fed to a sinusoidal generator 552. In a selected embodiment, generator 552 may be implemented as a ROM lookup table.

In accordance with the present invention, the pilot subcarrier signal generated by the digital PLL may be efficiently downsampled to match the underlying encoder sampling rate without using complex filtering circuits. As depicted in FIG. 5, the output 553 of the sinusoidal generator 552 is generated every Tclk=1/Fclk, where Fclk is the clock rate of the control loop (for example, 27 MHz). In a selected application of the digital PLL shown in FIG. 5, the output 553 is a pilot tone that is processed by a BTSC encoder at a rate (Fenc) that is lower than the clock rate of the control loop, Fclk. The sampling rate of the pilot tone 553 is converted from Fclk to Fenc by a downsampler 554 to generate an output pilot signal 555 that is combined with the rest of the BTSC composite signal.

Digital rate conversions are often accomplished through the use of Variable Interpolator Decimator (VID) structures that employ filters which minimize the undesirable aliasing effects that can accompany rate conversions. However, if the rate Fenc is an integer factor of Fclk (i.e. Fclk/N, where N is a positive integer), then the output of the sinusoidal generator 552 may be simply downsampled from the Fclk rate to the Fenc rate without any negative effects. The ideal sinusoidal samples that would have been required by a phase accumulator running at the Fenc rate are actually a simple subset of the sinusoidal samples that are produced by the phase accumulator running at the Fclk rate. By use of such a downsampler 554, VID structures are not required which both reduces complexity and saves area.

There may be situations where the encoder rate is not an integer factor of Fclk (for example Fenc=Fclk/(N+0.5)). In such situations, downsampling the output 553 of the sinusoidal generator 552 can produce undesirable effects. In this case, the ideal sinusoidal samples that would have been required by a phase accumulator running at the Fenc rate are not a subset of the sinusoidal samples that are produced by a phase accumulator running at the Fclk rate. Instead of using the costly VID structure to solve this problem, an embodiment of the present invention adds a compensating term to the output of the phase accumulator 550. In a selected embodiment, the pilot locking loop device 500 detects when the encoder rate is not an integer factor of Fclk (e.g., Fenc=Fclk/(N+0.5)), and adds a compensating term (e.g., PilotFreq/2) to the phase accumulator output 551 every other Fenc clock cycle. Of course, depending on the ratio of the encoder frequency and clock frequency, the size of the compensating term and the frequency of its insertion will change. As shown in FIG. 5, PilotFreq 541 is generated as an input to the accumulator by the pilot locking loop 500, and the accumulator phase 546 is fed back from the accumulator 550 to the adder 544. The compensating term in effect performs sinusoidal interpolation on the pilot tone, thereby eliminating the undesirable effects. As will be appreciated, the use of a compensating technique to implement sinusoidal interpolation may be generalized to other Fenc/Fclk relationships.

Figure 1:
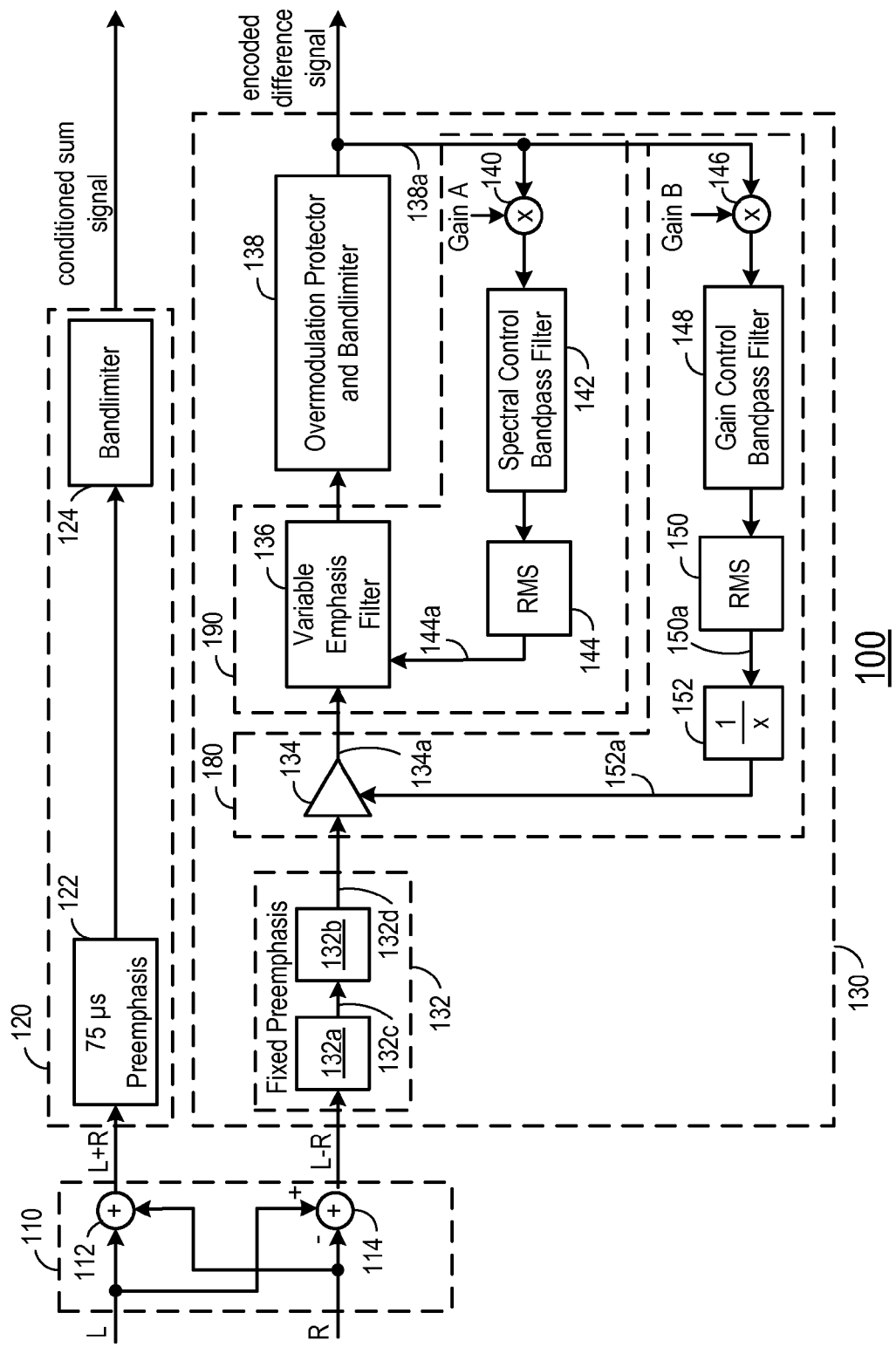
FIG. 1 shows a block diagram of a prior art analog BTSC encoder.
Figure 2:
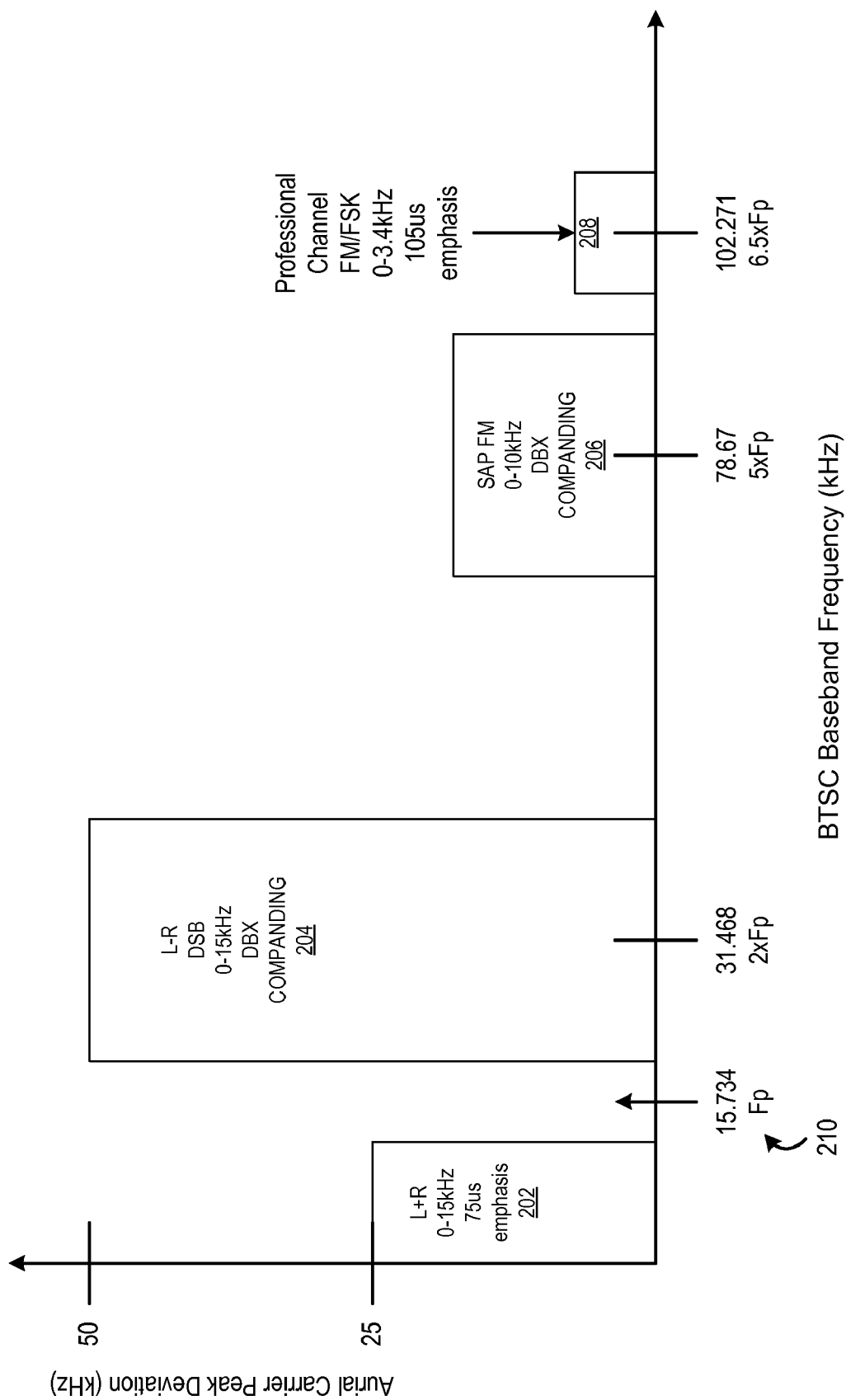
FIG. 2 is a graph of the spectrum of the BTSC composite signal.

For example, the pilot phase 551 may be used to generate the 2Fp carrier needed for the AM DSB SC modulation of the difference channel (L−R) compressor 340 output. This is achieved by scaling the output 551 of the line locked phase accumulator 550 by a factor of two and then feeding it to the sinusoidal generator ROM table 552. The output of the table 552 in this case is the 2×Fp carrier depicted in FIG. 2.

In addition, the pilot locking loop device 500 of the present invention is design limited to address corner case operations that arise with digital phase (and frequency) tracking loops. For example, if there is a large difference between the repetition rates of the two pulse trains at the phase detector input 504 (such as operation coming out of chip reset or operation during reconfiguration of the chip), there could exist situations where two (or more) pulses arrive on one input 502 before the other pulse arrives at input 548. In this case, the phase detector output 505 can increment (or decrement) more than once per reference period. In situations where this is undesirable, the present invention allows the range of possible maximum and minimum values of the phase detector output to be limited or saturated. This allows the largest-amplitude signals going to the loop filter to be limited, which then limits the response of the loop filter.

To control the maximum frequency difference of the sinusoidal output from its nominal value (as specified by the Pilot FCW 539), two programmable saturation blocks may be included in the loop filter. The first saturator 526 is located at the output of the integrator loop 508 accumulator adder 524, and the other saturator 532 is located at the output of the adder 530 that sums the linear 513 and integrator 529 terms of the loop filter. These saturators limit the loop filter offset from the nominal FCW and thereby prevent the loop from wandering so far from the nominal FCW during any corner case operation state that the loop acquisition time is negatively impacted once the corner case state is exited.

Figure 6:
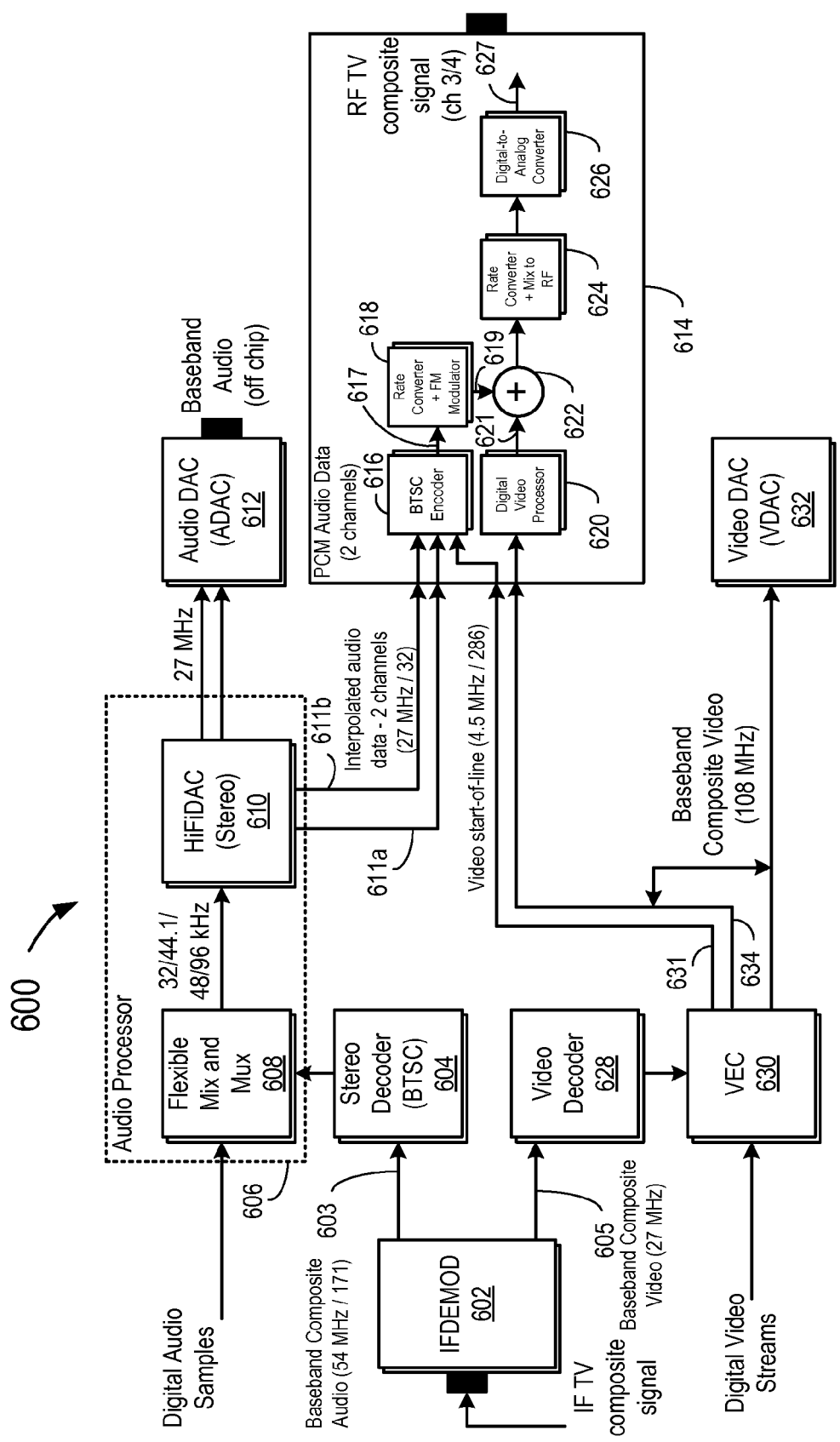
FIG. 6 is a diagram illustrating an application of the present invention in the RFM unit of a set-top box chip.

As referenced above, the present invention has many potential applications. For example, the digital frequency tracking signal may be used as the pilot subcarrier input to a BTSC encoder, such as depicted in FIG. 3. The present invention may also be integrated as part of a single chip set-top box fabricated with CMOS technology. The present invention may also be included in an RF modulator core (RFM 614) as depicted in FIG. 6 for generating the RF TV composite signal that is used by a set-top box to generate channel 3/4 (or such) output signal(s) 627. In this application, the baseband BTSC composite signal 617 is fed to a FM modulator 618 that modulates the aural carrier, and the resulting signal 619 is then summed with a baseband composite video signal 621 with adder 622. The combined audio/video signal is mixed to a RF frequency 624, converted to analog form 626 and sent off chip 627. In the depicted embodiment, RFM 614 converts a NTSC/PAL/SECAM compliant digital composite video source 634 and a pulse code modulated (PCM) audio source 611a, 611b into an analog composite television signal 627 that is suitable for demodulation by a television demodulator. Moreover, the RFM 614 may stereo encode the audio source according to the BTSC standard. When BTSC encoding is used, a digital phase lock loop embodiment of present invention (such as illustrated in FIG. 5) may be used to generate a digital sinusoid input to the BTSC encoder 616.

When the loop 500 is frozen, the rollover signal 548 becomes a free running sinusoid with a period of 27 MHz/1716=15.734 kHz, where the 27 MHz refers to the internally generated clock (Fclk) and 15.734 kHz refers to the horizontal scanning frequency of the transmitted signal. However, because the internally generated clocks are not in general locked to the video line rate, the rollover signal 548 frequency can be adjusted in accordance with the present invention to account for the mismatch between the actual video line rate 502 and the free running rollover 548 period. When the loop 500 is not frozen, a counter 504 is incremented upon the detection of the video start of line pulse at the input reference line 502. The same counter 504 is decremented upon the detection the peak of an internally generated pilot signal 548. Thus, the counter value detects the error in the frequencies of the two signals 502, 548 and applies standard linear plus proportional filtering 506, 508 to that error 505. The loop filter output is used to adjust the pilot frequency.

In a single chip integrated circuit embodiment of the present invention, a digital BTSC encoder 616 is disclosed for encoding stereo audio signals 611, where the encoder 616 is integrated as part of a single chip set-top box 600 fabricated with CMOS technology. Upon integration into a set-top box chip 600, the present invention reduces board level components, thereby reducing costs and improving performance over prior art approaches. Thus, the present invention shows, for the first time, a fully integrated digital BTSC encoder 616 that may be implemented in CMOS as part of a single chip set-top box 600.

In a selected embodiment, the present invention provides a technique for producing a digital sinusoid that is frequency-locked to a simple two-state input reference signal 502 whose repetition rate is equal to the horizontal scan rate of the video signal. This invention can be implemented in an efficient manner using a simple phase detector, a low-complexity loop filter, a pilot frequency offset adder, a phase accumulator and a sinusoidal generator. By using a high-frequency system clock (Fclk), good acquisition/tracking performance is provided. In addition, the present invention efficiently provides for lower-rate post-processing of the pilot tone without a costly variable interpolator decimator. A hardware-efficient multi-channel sound encoding subsystem can then be connected to the output and operated at a significantly lower rate while still keeping the high-performance frequency acquisition/tracking provided by the high rate of the tracking loop.

For example, in a BTSC encoder implementation, the frequency-tracking loop runs at 27 MHz for good frequency acquisition/tracking. The overall BTSC multi-channel sound encoder does not need this high clock rate because the highest frequency content within the encoder is less than 120 kHz. To allow proper digital processing of the signals, the encoder should operate at a minimum sample rate of approximately at least ten times the bandwidth of the signal being encoded, e.g., 150-200 kHz. The choice of the sampling rate is driven by the need for the digital filter implementations to more closely match the analog filter transform functions (specified by the BTSC standard) in both magnitude and phase. A sample rate of 316 kHz results in good matching of the magnitude and phase responses between the analog and digital domains so that no phase compensation errors need to be introduced into the encoding process. In a selected embodiment, the encoder runs at (27 MHz/85.5)=315.789 kHz. The invention produces a high-quality sinusoid at this rate that can be directly used by this lower-speed encoder.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. An apparatus comprising:
   a phase detector to receive a reference signal at a reference frequency and a feedback signal and to detect a phase relationship between the reference signal and the feedback signal, the phase detector being clocked by a clock signal at a clock frequency which is sufficiently higher than the reference frequency to sample the reference signal to generate a phase difference signal as an output from the phase detector to indicate the phase relationship;
   a digital loop filter clocked at the clock frequency to receive the phase difference signal and to filter the phase difference signal to generate an offset signal as an indication of the phase relationship between the reference signal and the feedback signal;
   a phase accumulator coupled to receive a value associated with a frequency of an output signal and also coupled to receive the offset signal, in which the phase accumulator provides offset adjustments to the value setting the frequency of the output signal to generate a phase corrected signal and the feedback signal;
   a sinusoid generator coupled to receive the phase corrected signal to generate an output signal that tracks to the reference signal; and
   a down sampler to down sample the output signal of the sinusoid generator to generate a down-sampled signal at a frequency lower than the clock frequency, wherein the down-sampled signal is used for generating a pilot signal for a BTSC encoder circuit.

2. The apparatus of claim 1, wherein the phase detector includes an up/down counter to count signal state changes of the reference signal and the feedback signal to detect the phase relationship between the reference signal and the feedback signal.

3. The apparatus of claim 1, wherein the digital loop filter includes a first digital filter to determine a proportional value and a second digital filter to determine an integrator value, wherein the proportional and integrator values are combined to generate the offset signal.

4. The apparatus of claim 3, wherein the first digital filter and the second digital filter each includes a cascade of multiple programmable stages.

5. The apparatus of claim 1, wherein the clock frequency is an integer multiple of the frequency of the down-sampled signal.

6. The apparatus of claim 1, wherein when the clock frequency is a non-integer multiple of the frequency of the down-sampled signal, the phase accumulator introduces a compensating value to the phase corrected signal to compensate for the non-integer multiple.

7. The apparatus of claim 1, wherein the digital loop filter includes a saturator to limit the offset signal.

8. A method comprising:
   detecting in a phase detector a phase relationship between a feedback signal and a received reference signal that is at a reference frequency, wherein the phase detector is clocked by a clock signal at a clock frequency which is sufficiently higher than the reference frequency to sample the reference signal to generate a phase difference signal as an output from the phase detector to indicate the phase relationship;
   filtering at the clock frequency the phase difference signal to generate an offset signal as an indication of the phase relationship between the reference signal and the feedback signal;
   generating an offset adjustment to a value associated with a frequency of an output signal based on the offset signal to generate a phase corrected signal and the feedback signal;
   generating an output signal that tracks to the reference signal based on the phase collected signal; and
   down sampling the output signal to generate a down-sampled signal at a frequency lower than the clock frequency, wherein the down-sampled signal is used for generating a pilot signal for a BTSC encoder circuit.

9. The method of claim 8, wherein the detecting includes using an up/down counter to count signal state changes of the reference signal and the feedback signal to detect the phase relationship between the reference signal and the feedback signal.

10. The method of claim 8, wherein the filtering includes filtering to determine a proportional value and filtering to determine an integrator value, wherein the proportional and integrator values are combined to generate the offset signal.

11. The method of claim 8, wherein the filtering includes use of a cascade of multiple programmable stages in a digital filter.

12. The method of claim 8, wherein the clock frequency is an integer multiple of the frequency of the down-sampled signal.

13. The method of claim 8, wherein when the clock frequency is a non-integer multiple of the frequency of the down-sampled signal, the phase corrected signal includes a compensating value to compensate for the non-integer multiple.

14. The method of claim 8, wherein the filtering includes a saturator to limit the offset signal.

* * * * *

UNITED STATES PATENT AND TRADEMARK OFFICE
CERTIFICATE OF CORRECTION

| | | |
|---|---|---|
| PATENT NO. | : 7,750,975 B2 | Page 1 of 1 |
| APPLICATION NO. | : 12/269140 | |
| DATED | : July 6, 2010 | |
| INVENTOR(S) | : Erik Berg et al. | |

It is certified that error appears in the above-identified patent and that said Letters Patent is hereby corrected as shown below:

Claim 8, Col. 12, line 2, after "phase" delete "collected" and insert --corrected--

Signed and Sealed this
Twentieth Day of March, 2012

David J. Kappos
*Director of the United States Patent and Trademark Office*